INVENTORS
JACQUES RUBENTHALER
RENÉ GILLARD
BY
ATTORNEY

3,337,149
ENDLESS FILM WINDING DEVICE
Jacques Rubenthaler and René Gillard, Yverdon, Vaud, Switzerland, assignors to Paillard S.A., Vaud, Switzerland, a corporation of Switzerland
Filed July 27, 1965, Ser. No. 475,142
Claims priority, application Switzerland, Aug. 12, 1964, 10,510/64
4 Claims. (Cl. 242—55.19)

ABSTRACT OF THE DISCLOSURE

An endless kinematographic film winding device which includes a plurality of similar frustoconical film supports having downwardly sloping axes which are distributed in angularly spaced planes around a vertical axis at an angle which, with reference to a horizontal plane, is equal to one half of the apical angle of the frustroconical supports. The generating lines of each support extend between a smaller inner base nearer the vertical axis and an outer larger base, and means is provided for driving the frustoconical supports in unison into rotation around the vertical axis at an angular speed such that the points of the generating lines are all driven at the same peripheral linear speed by the combination of said two rotations.

---

In arrangements projecting continuously a film such as an advertising film, the films to be used form generally an endless loop. It is therefore necessary to provide a magazine wherein the winding of the film is performed at the same speed as that at which it is drawn out of the magazine. When the film forms a roll inside the magazine and it is wound off the inner edge of the roll while it is being wound simultaneously over the outer edge of the roll or reversely, it is found that the convolutions of the film rub frictionally against one another on the one hand and between the film and the film carrying means on the other hand. As a matter of fact, the diameter of the convolutions varies continuously between the inner edge and the outer edge of the roll whereas the linear speed of the film should remain constant. An arrangement of the type referred to is operable only when the capacity of the magazine is reduced and the inner and outer diameters of the roll are not very different from each other.

The object of the present invention is a magazine of a large capacity adapted for instance to carry several hundred meters of film. To this end, it is necessary to carry the roll in a manner such that its convolutions may all assume the same peripheral speed.

In order to reduce the friction between the film and the means carrying the latter, it has already been proposed to resort to carrier means constituted by frustoconical rollers having a horizontal axis and distributed along a circle. However, such a solution of the problem is imperfect and the film is nevertheless subjected to comparatively large friction.

The present invention has more specifically for its object a magazine for a kinematographic film constituted by an endless loop inside which the film may be inserted in the shape of a roll lying horizontally on frustoconical rollers so as to be unwound from the inside or the outside of the roll and to feed a projector while it is simultaneously wound outwardly or inwardly of the roll, as the case may be, as the film passes out of the projector. The main feature of the invention consists in that the frustoconical rollers are constituted by planet members arranged along a circle and the axes of which slope with reference to a horizontal plane and meet on a vertical axis passing through the centre of said circle. The apical opening of the frustoconical planet members is substantially equal to twice the sloping angle of said axis with reference to a horizontal plane so that the upper generating lines of said members lie substantially in a horizontal plane, said planet members being adapted to rotate in unison around said vertical axis on the one hand and around its sloping axis on the other hand, respectively at speeds $N_1$ and $N_2$, the ratio between which is defined by the following equation $$\frac{N_1}{N_2} = \frac{D_2 - d_2}{D_1 - d_1}$$

$D_1$, $d_1$, $D_2$, $d_2$ being respectively the diameters of the circle passing through the outer ends of said upper generating lines, of the circle passing through the inner ends of said generating lines, of the base of the frustoconical members further away from the vertical axis and of the smaller base of said members nearer the vertical axis, whereby the peripheral speed of the said upper generating lines lying in the plane carrying the roll may be the same throughout the length of said generating lines.

The accompanying drawings illustrate by way of example a preferred embodiment of a magazine forming the object of the invention. In said drawings.

Figure 1:
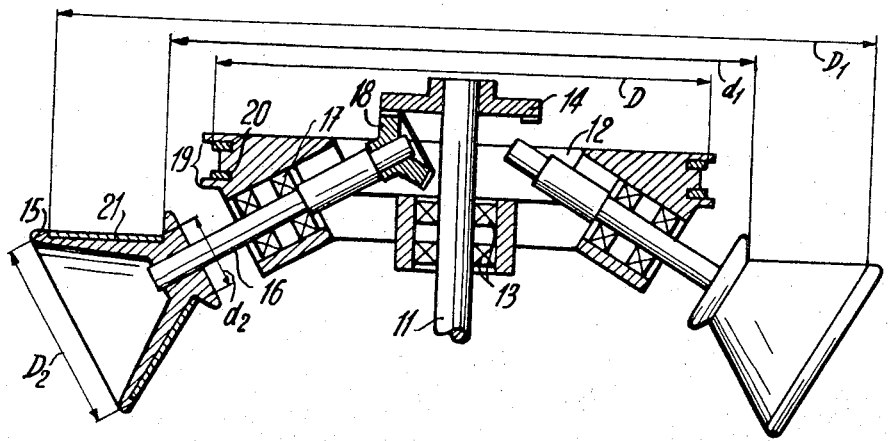
FIG. 1 is a vertical sectional view of the magazine mechanism.
Figure 2:
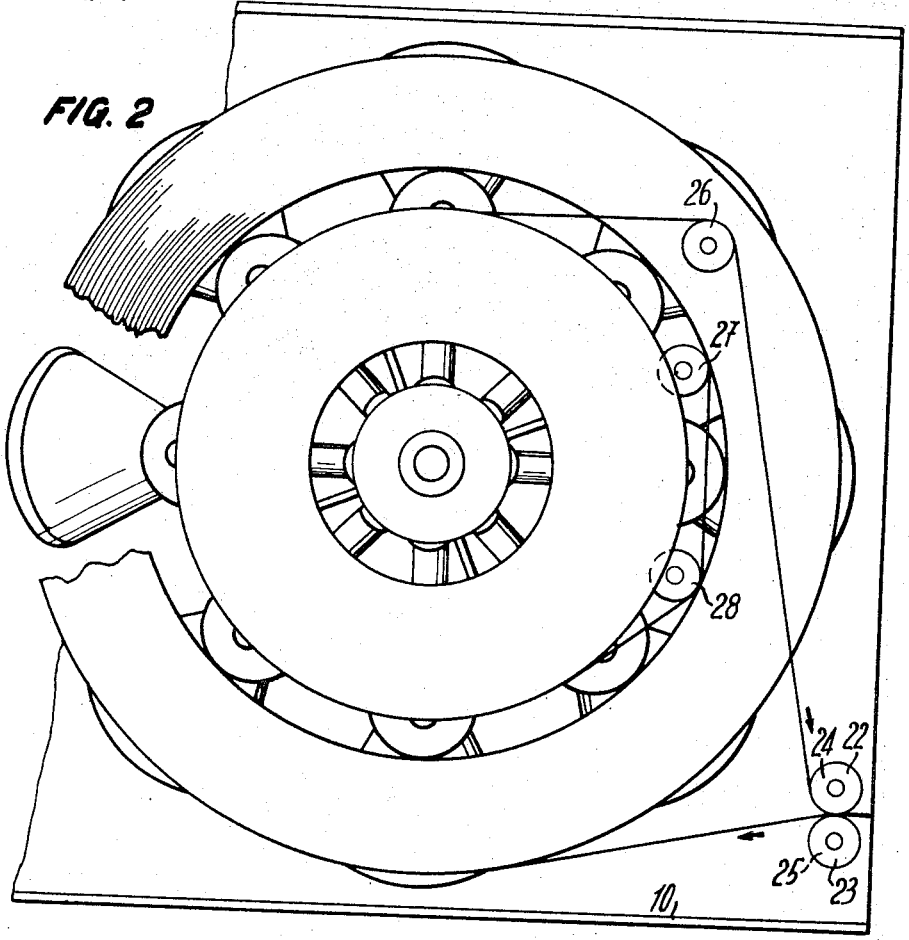
FIG. 2 is a plan view thereof, after removal of the cover of its casing.

The magazine includes a casing 10 to the bottom of which is secured a vertical spindle or rod 11. A disc 12 is fitted on the spindle 11 with the interposition of two ball bearings 13. The vertical spindle 11 carries furthermore at its upper end a pinion 14. The disc 12 carries a number of frustoconical planet members 15 located each at the end of a sloping spindle 16. Each spindle 16 is carried in a ball bearing 17 so as to be capable of revolving around its axis. As is apparent from reference to FIG. 2, the disc 12 carries eight frustoconical planet members 15 of which one half can rotate freely in the bearings 17 whereas the spindle 16 of the other frustoconical members extends into registry with the stationary pinion 14 which ensures their being driven around their axis when they rotate around vertical axis, as provided by means of the pinion 18 keyed to the corresponding spindle 16.

The disc 12 includes two flanges 19 adapted to guide the film winding around the disc as it passes off the roll resting on the frustrocones as described hereinafter. The periphery of the disc is also provided with two linings 20 having a high frictional coefficient and which engages the film.

The frustoconical members 15 which are driven by the pinions 18 are also protected by a lining 21 having a high frictional coefficient, with a view to driving the convolutions of the roll, which convolutions rest through their lower edges on said lining 21. The magazine includes also two pairs of guiding rollers 22, 23 and 24, 25 arranged in super-position, the first pair guiding the film passing out of the magazine and the second, the film entering said magazine. A transmission roller 26 guides the film off the edge of the disc 12 towards the first pair of rollers 22 and 23 while two rollers 27 and 28 guide the film from the inner convolution of the roll onto the edge of the disc 12.

The operation of the magazine is as follows: the film drawn out by the projector in the direction shown by the arrows causes the disc 12 to rotate around the spindle 11. The frustoconical members 15, the spindles 16 of which carry pinions 18, start rotating in the opposite direction. The absolute peripheral speed of the upper generating line, i.e., the line of contact between a film coil and a member, is equal at any point of said generating line, to the peripheral speed imparted by the rotation of the disc, minus that corresponding to the rotation of the frustoconical member.

Assuming $N_1$ and $N_2$ designate the rotary speed of the disc 12 and of the members 15 respectively, the absolute peripheral speeds of the points at the inner and outer ends of the upper generating line are respectively:

$$v_{d_1} = \pi d_1 N_1 - \pi d_2 N_2$$
$$v_{D_1} = \pi D_1 N_1 - \pi D_2 N_2$$

The outer convolution of the film roll should be wound at the same linear speed as that at which the inner convolution is drawn off so that it is necessary to obtain $$v_{d_1} = v_{D_1}$$

or $$\pi d_1 N_1 - \pi d_2 N_2 = \pi D_1 N_1 - \pi D_2 N_2$$

which leads to $$\frac{N_1}{N_2} = \frac{D_2 - d_2}{D_1 - d_1}$$

Obviously if the absolute peripheral speed is the same at both ends of the upper generating line, it will remain constant throughout the length of the latter.

The diameter D of the disc 12 should be selected in a manner such that its peripheral speed may be equal to the translational speed of the film, in other words to the speed.

In a modification, the spindle 11 may be rigid with the disc 12 and fitted revolvably in the casing with which the pinion 14 is rigid. Instead of driving the disc 12 by drawing the film along its path, it is sufficient to make the spindle 11 revolve at the desired speed.

According to a further modification, it is possible to cut out the pinion 14 and all the pinions 18, the rotation of the frustoconical members around their axes being performed by the direct frictional action exerted by the film.

According to a last modification, it is possible to cut out the part of the disc 12 around which the film is wound in the embodiment illustrated so that said film is then drawn directly off the roll.

We claim:

1. A magazine for an endless kinematographic film feeding a kinematographic projector, comprising a plurality of similar frustoconical supports having downwardly sloping axes which are distributed in angularly spaced planes around a vertical axis at an angle with reference to a horizontal plane which is equal to one-half of the apical angle of the frustoconical supports, the generating lines of each support extending between a smaller inner base nearer the vertical axis and an outer larger base, means driving the frustoconical supports in unison into rotation around the vertical axis at a first angular speed $N_1$ and means driving at least a number of said frustoconical supports into rotation around their sloping axes at a second angular speed $N_2$, the ratio between said speeds $N_1$ and $N_2$ being such that $$\frac{N_1}{N_2} = \frac{D_2 - d_2}{D_1 - d_1}$$

$D_1$ and $d_1$ being the diameters of the circles described around the vertical axis by the outer and inner ends respectively of the upper generating lines of the supports $D_2$ and $d_2$ being the diameters of the inner and outer bases of each support, the film being wound over the plane defined by the upper generating lines of the supports, the points of which generating lines are all driven at the same peripheral linear speed by the combination of said two rotations.

2. A magazine for an endless kinematographic film feeding a kinematographic projector, comprising a plurality of similar frustoconical supports having downwardly sloping axes which are distributed in angularly spaced planes around a vertical axis at an angle with reference to a horizontal plane which is equal to one-half of the apical angle of the frustoconical supports, the generating lines of each support extending between a smaller inner base nearer the vertical axis and an outer larger base, a horizontal carrier revolvably carrying said supports, means driving said carrier with the supports into rotation around the vertical axis at a first angular speed $N_1$ and means driving at least a number of said frustoconical supports into rotation around their sloping axes at a second angular speed $N_2$, the ratio between said speeds $N_1$ and $N_2$ being such that $$\frac{N_1}{N_2} = \frac{D_2 - d_2}{D_1 - d_1}$$

$D_1$ and $d_1$ being the diameters of the circles described around the vertical axis by the outer and inner ends respectively of the upper generating lines of the supports and $D_2$ and $d_2$ the diameters of the inner and outer bases of each support, the film being wound over the plane defined by the upper generating lines of the supports, the points of which generating lines are all driven at the same peripheral linear speed by the combination of said two rotations.

3. A magazine for an endless kinematographic film feeding a kinematographic projector comprising a plurality of similar frustoconical supports having downwardly sloping axes which are distributed in angularly spaced planes around a vertical axis at an angle with reference to a horizontal plane which is equal to one-half of the apical angle of the frustoconical supports, the generating lines of each support extending between a smaller inner base nearer the vertical axis and an outer larger base, means driving the frustoconical supports in unison into rotation around the vertical axis at a first angular speed $N_1$, pinions coaxially rigid with at least a number of corresponding supports and a stationary pinion coaxial with the vertical axis and meshing with the first-mentioned pinions to ensure the rotation with the latter around their sloping axes at a second angular speed $N_2$, the ratio between said speeds $N_1$ and $N_2$ being such that $$\frac{N_1}{N_2} = \frac{D_2 - d_2}{D_1 - d_1}$$

$D_1$ and $d_1$ being the diameters of the circles described around the vertical axis by the outer and inner ends respectively of the upper generating lines of the supports and $D_2$ and $d_2$ being the diameters of the inner and outer bases of each support, the film being wound over the plane defined by the upper generating lines of the supports, the points of which generating lines are all driven at the same peripheral linear speed by the combination of said two rotations.

4. A magazine for an endless kinematographic film feeding a kinematographic projector comprising a plurality of similar frustoconical supports having downwardly sloping axes which are distributed in angularly spaced planes around a vertical axis at an angle with reference to a horizontal plane which is equal to one-half of the apical angle of the frustoconical supports, the generating lines of each support extending between a smaller inner base nearer the vertical axis and an outer larger base, a disc revolvably carrying said supports and around the edge of which the endless film is wound before reentering the projector, to thereby drive the disc with the supports into rotation around the vertical axis at a first angular speed $N_1$, pinions coaxially rigid with at least a number of corresponding supports and a stationary pinion coaxial with the first-mentioned pinions to ensure the rotation of the latter around their sloping axes at a second angular speed $N_2$, the ratio between said speeds $N_1$ and $N_2$ being such that $$\frac{N_1}{N_2} = \frac{D_2 - d_2}{D_1 - d_1}$$

$D_1$ and $d_1$ being the diameters of the circles described around the vertical axis by the outer and inner ends respectively of the upper generating lines of the supports and $D_2$ and $d_2$ being the diameters of the inner and outer bases of each support, the film being wound out of the projector and onto the edge of the disc over the plane defined by the upper generating lines of the supports, the points of which generating lines are all driven at the same peripheral linear speed by the combination of said rotations.

References Cited

UNITED STATES PATENTS

| | | | |
|---|---|---|---|
| 2,037,601 | 4/1936 | Shirlow et al. | 242—55.21 |
| 2,706,629 | 5/1955 | Cailliot | 242—55.19 |

FOREIGN PATENTS

| | | |
|---|---|---|
| 279,869 | 4/1928 | Great Britain. |
| 281,285 | 1/1931 | Italy. |

FRANK J. COHEN, *Primary Examiner.*

BILLY S. TAYLOR, *Examiner.*